(12) United States Patent
Cho et al.

(10) Patent No.: US 7,849,136 B2
(45) Date of Patent: Dec. 7, 2010

(54) COMPUTER PROGRAM PRODUCT AND SYSTEM COMPRISING COMMUNITY MANAGEMENT METHOD

(75) Inventors: Weduke Cho, Seongnam-si (KR); Hyeonsook Kim, Suwon-si (KR); Soondong Kim, Suwon-si (KR); Yunju Shim, Suwon-si (KR); Dongsoon Choi, Seoul (KR)

(73) Assignee: Ajou University Industry Corporation Foundation, Suwon-si, Gyeonggi-do (KR)

( * ) Notice: Subject to any disclaimer, the term of this patent is extended or adjusted under 35 U.S.C. 154(b) by 159 days.

(21) Appl. No.: 12/160,334

(22) PCT Filed: Jan. 5, 2007

(86) PCT No.: PCT/KR2007/000088

§ 371 (c)(1),
(2), (4) Date: Jul. 9, 2008

(87) PCT Pub. No.: WO2007/081118

PCT Pub. Date: Jul. 19, 2007

(65) Prior Publication Data

US 2008/0313262 A1    Dec. 18, 2008

(30) Foreign Application Priority Data

Jan. 10, 2006 (KR) ...................... 10-2006-0002853
Jan. 5, 2007 (KR) ...................... 10-2007-0001640

(51) Int. Cl.
G06F 15/16    (2006.01)

(52) U.S. Cl. ...................... 709/204; 709/201; 709/206; 709/207; 709/216

(58) Field of Classification Search ................. 709/205, 709/212, 214, 227, 228, 201, 204, 206, 207, 709/216
See application file for complete search history.

(56) References Cited

U.S. PATENT DOCUMENTS 6,775,833 B1 *   8/2004   Gits et al. .................... 719/310

(Continued)

FOREIGN PATENT DOCUMENTS

KR    20020041357    6/2002

(Continued)

*Primary Examiner*—Djenane M Bayard
(74) *Attorney, Agent, or Firm*—Harness, Dickey & Pierce, P.L.C.; Anthony G. Fussner; Kisuk Lee

(57) ABSTRACT

The present invention provides a community computing method and system comprising a step of community formation forming a community by defining a goal, policies, members, operations among the members, an operation situation of the community and an idle situation of the community, a step of community standby both waiting for an operation starting timing and organizing an actual community member, after the step of community formation, a step of community activation both being self activated and starting an operation, when the community operation situation is ready while the community monitors a context information, after the step of community standby, a step of community deactivation both temporarily stopping an operation for itself and waiting for a next community operation, when the community satisfies the goal of the community, or a situation to deactivate comes in, after the step of community activation; and, a step of community termination terminating all operations for itself in case the community does not need to operate any more.

25 Claims, 12 Drawing Sheets

U.S. PATENT DOCUMENTS

| | | | |
|---|---|---|---|
| 2002/0087636 A1* | 7/2002 | Matsuda et al. | 709/205 |
| 2003/0084053 A1* | 5/2003 | Govrin et al. | 707/100 |
| 2003/0220970 A1* | 11/2003 | Komsi | 709/204 |
| 2004/0172464 A1* | 9/2004 | Nag | 709/223 |
| 2005/0138181 A1 | 6/2005 | Gallet et al. | |
| 2007/0113187 A1* | 5/2007 | McMullen et al. | 715/742 |
| 2009/0119222 A1* | 5/2009 | O'Neil et al. | 705/76 |

FOREIGN PATENT DOCUMENTS

KR 20040069928 8/2004

* cited by examiner

[Fig. 1]
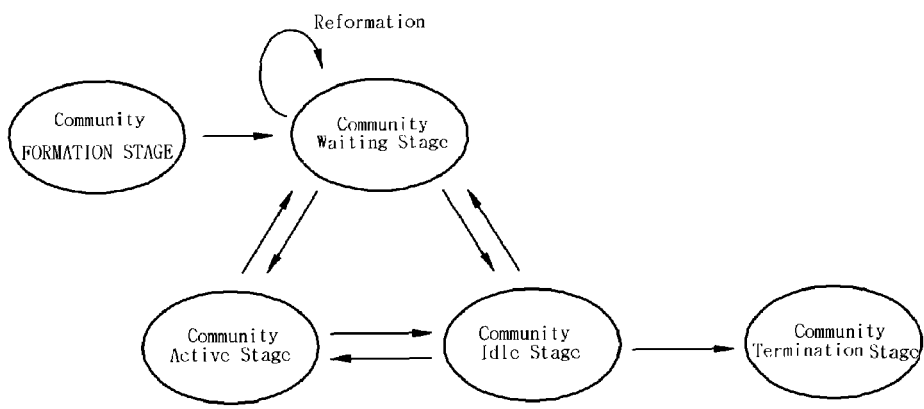
[Fig. 2]
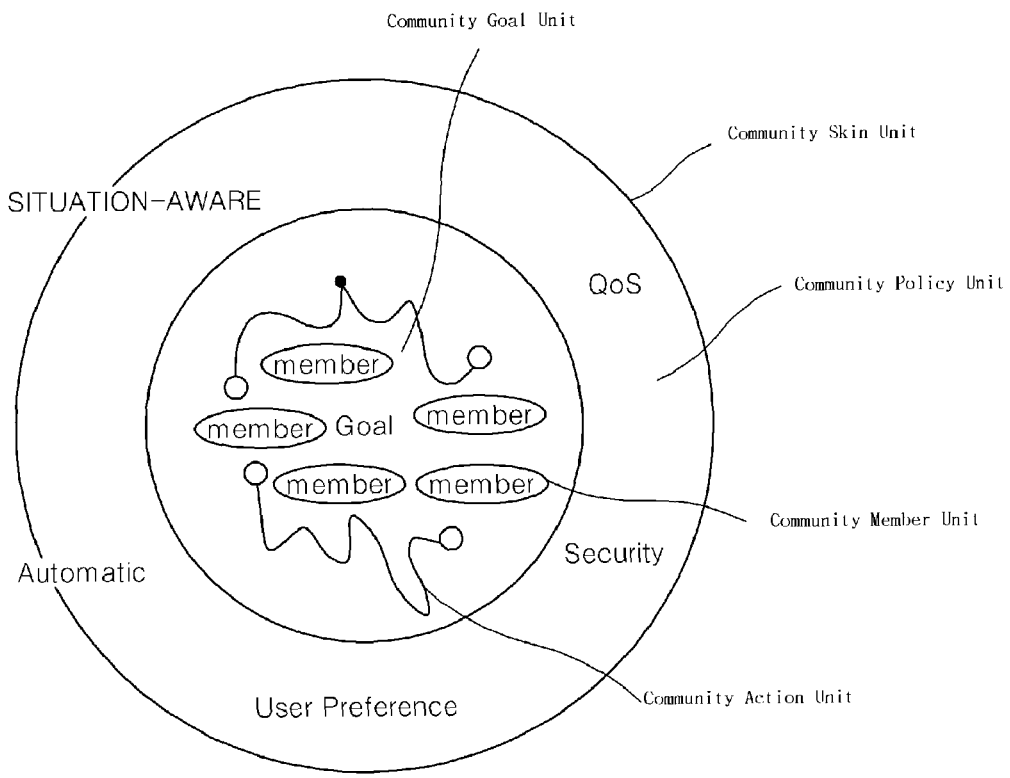

[Fig. 3]
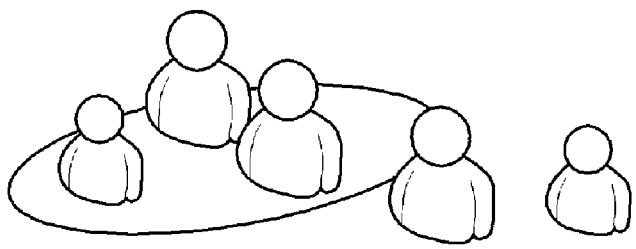
User Community
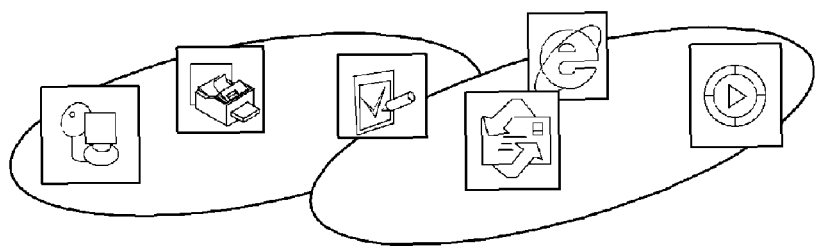
Service Community
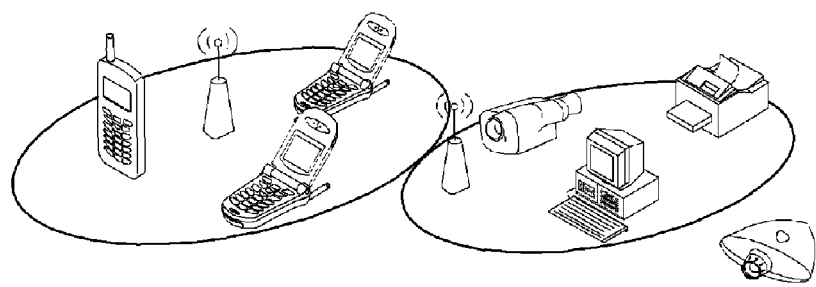
Infrastructure Community

[Fig. 4]
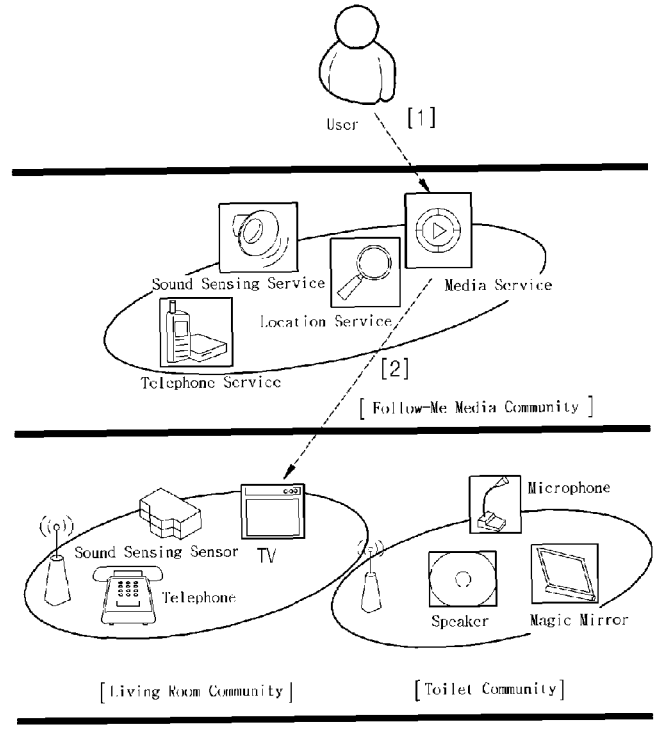
[Fig. 5]
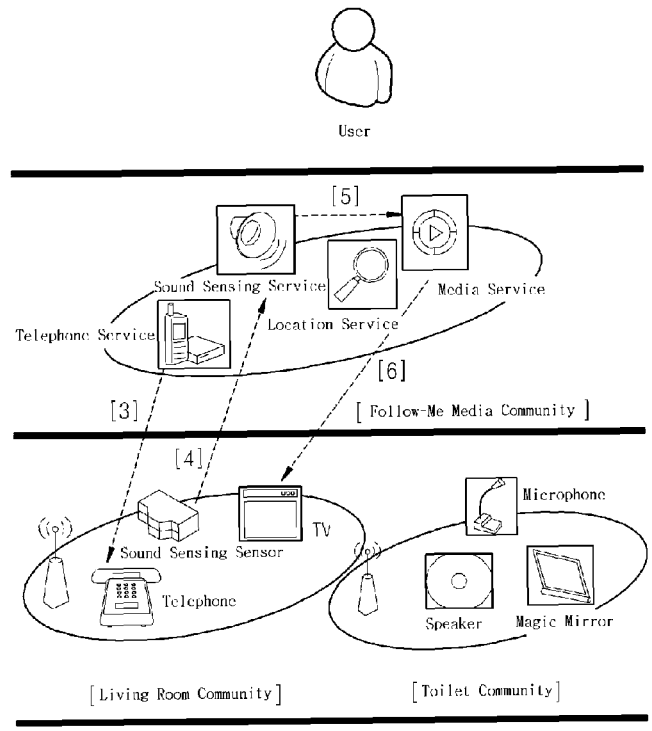

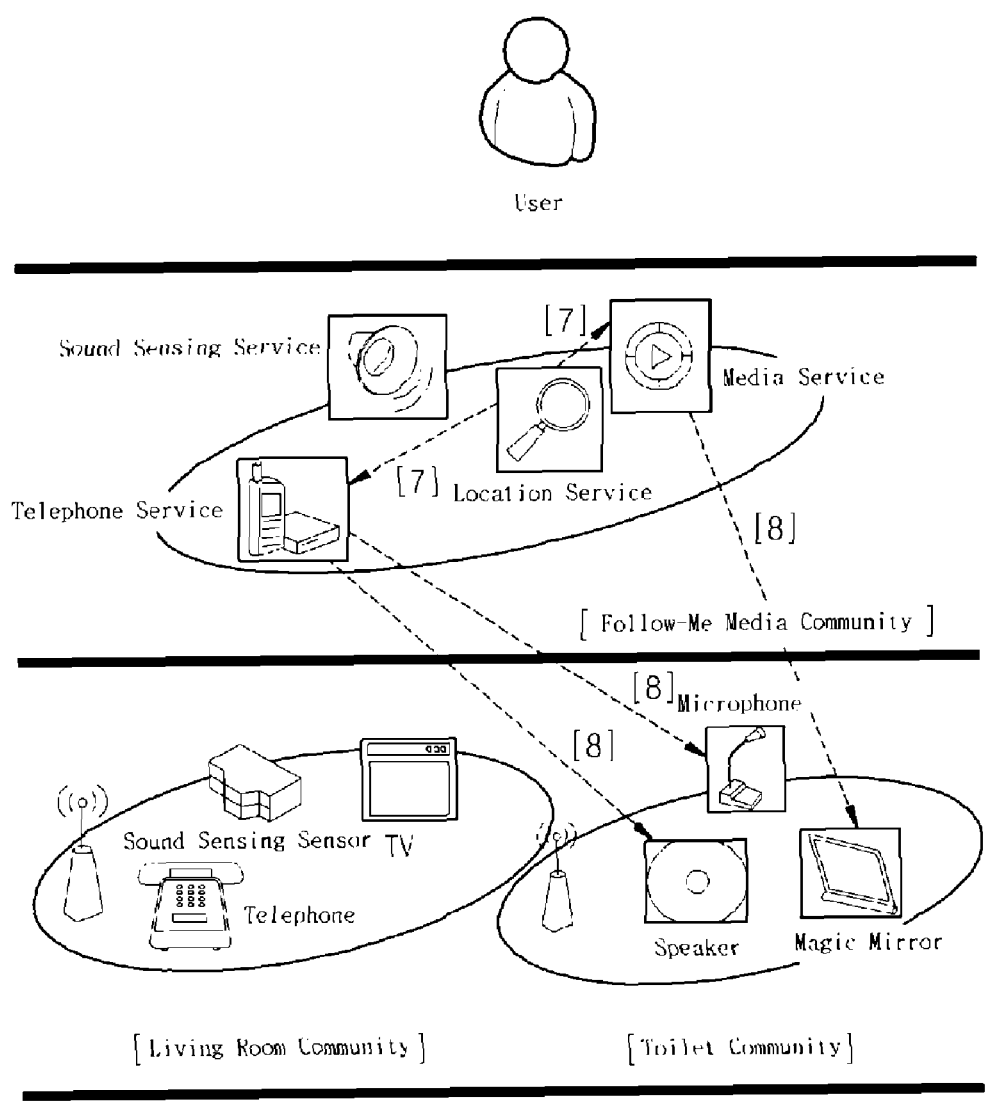
[Fig. 6]

[Fig. 7]
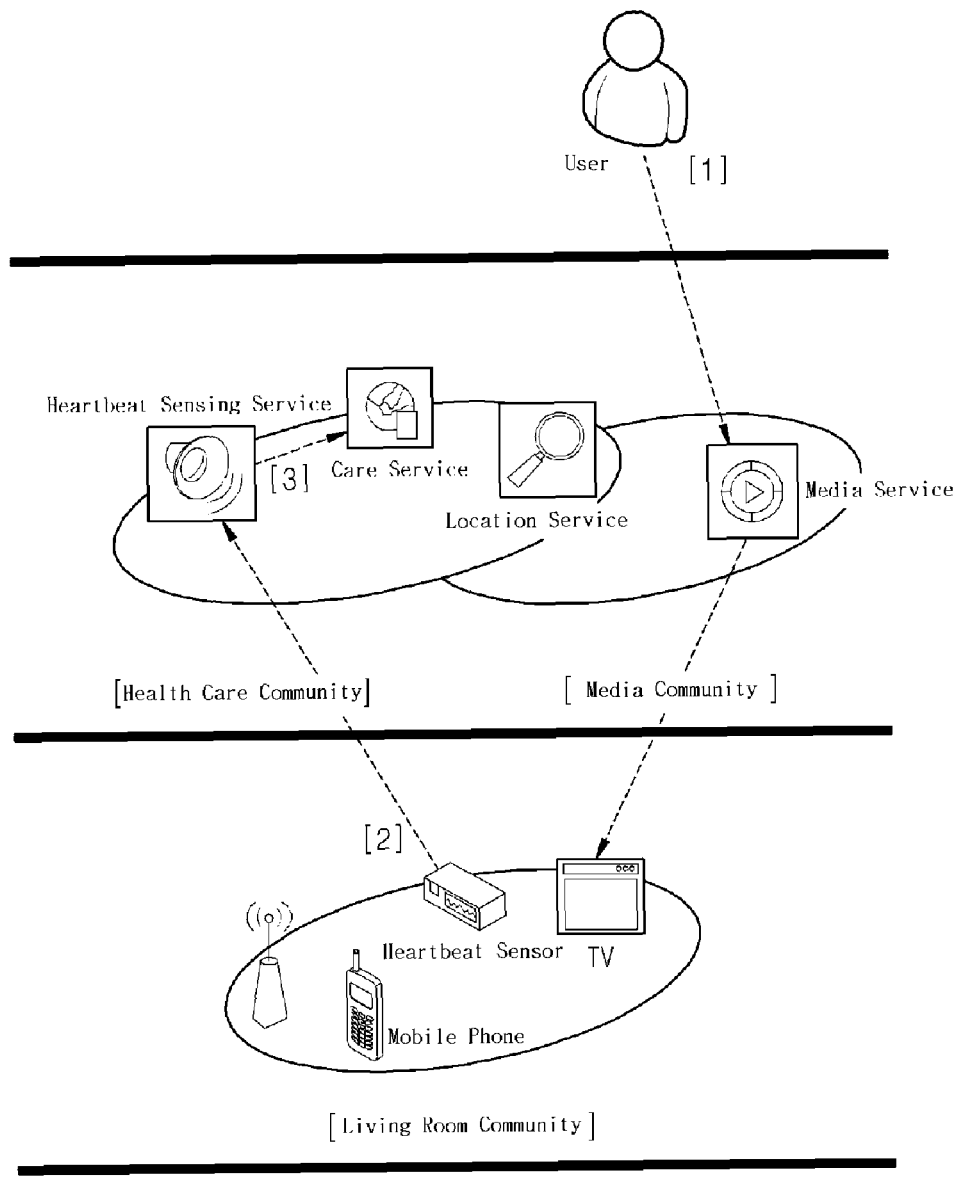

[Fig. 8]
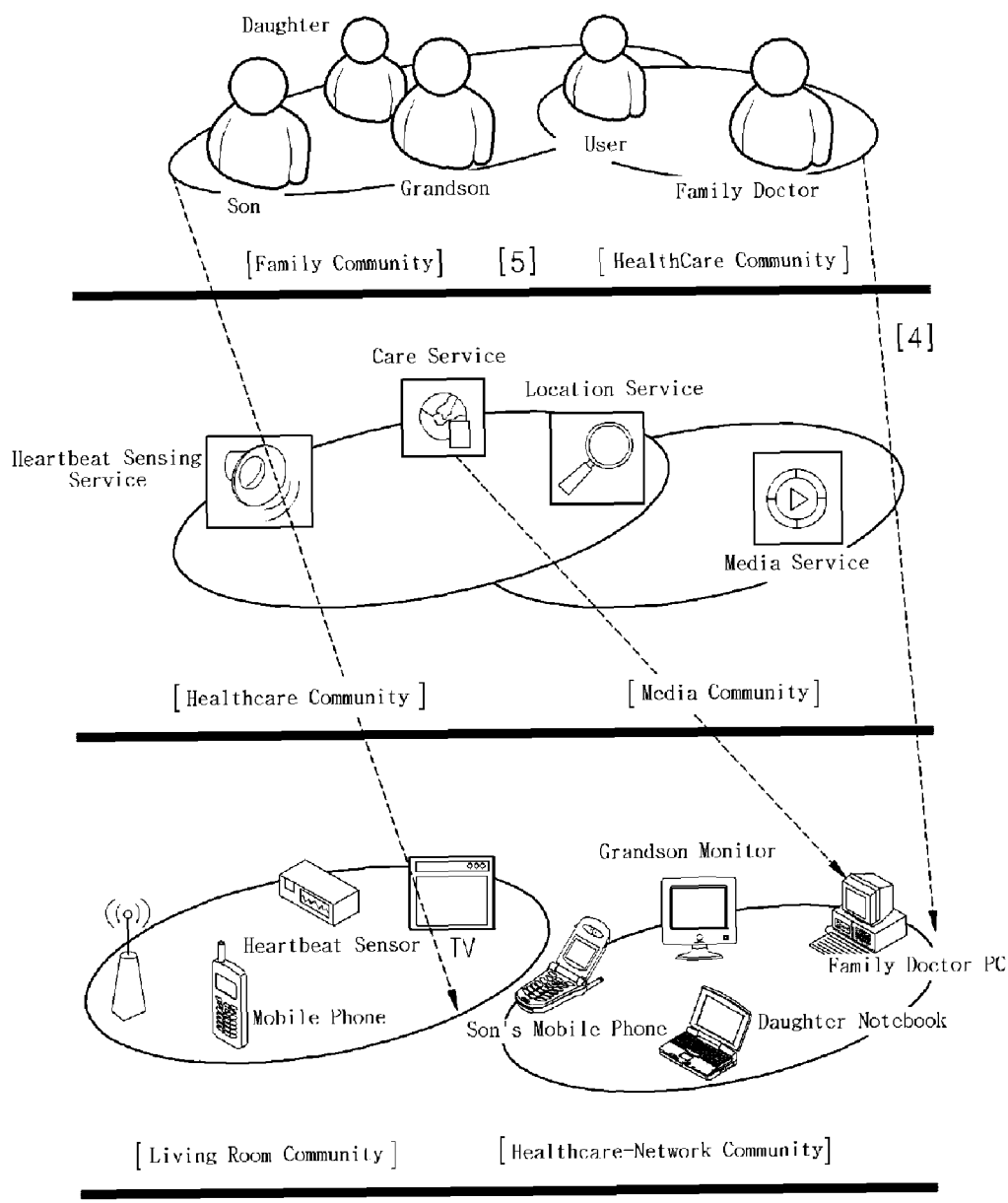

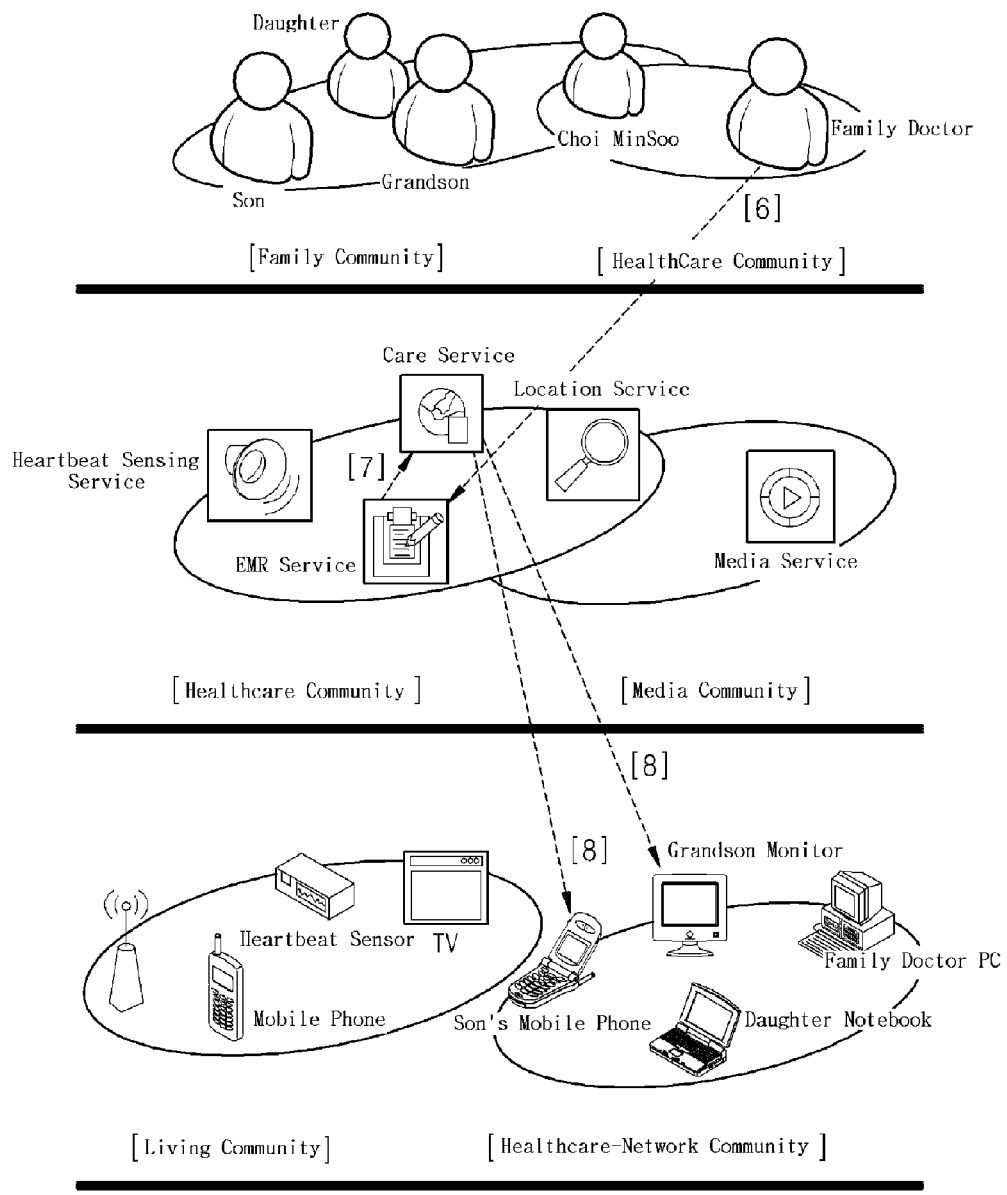
[Fig. 9]

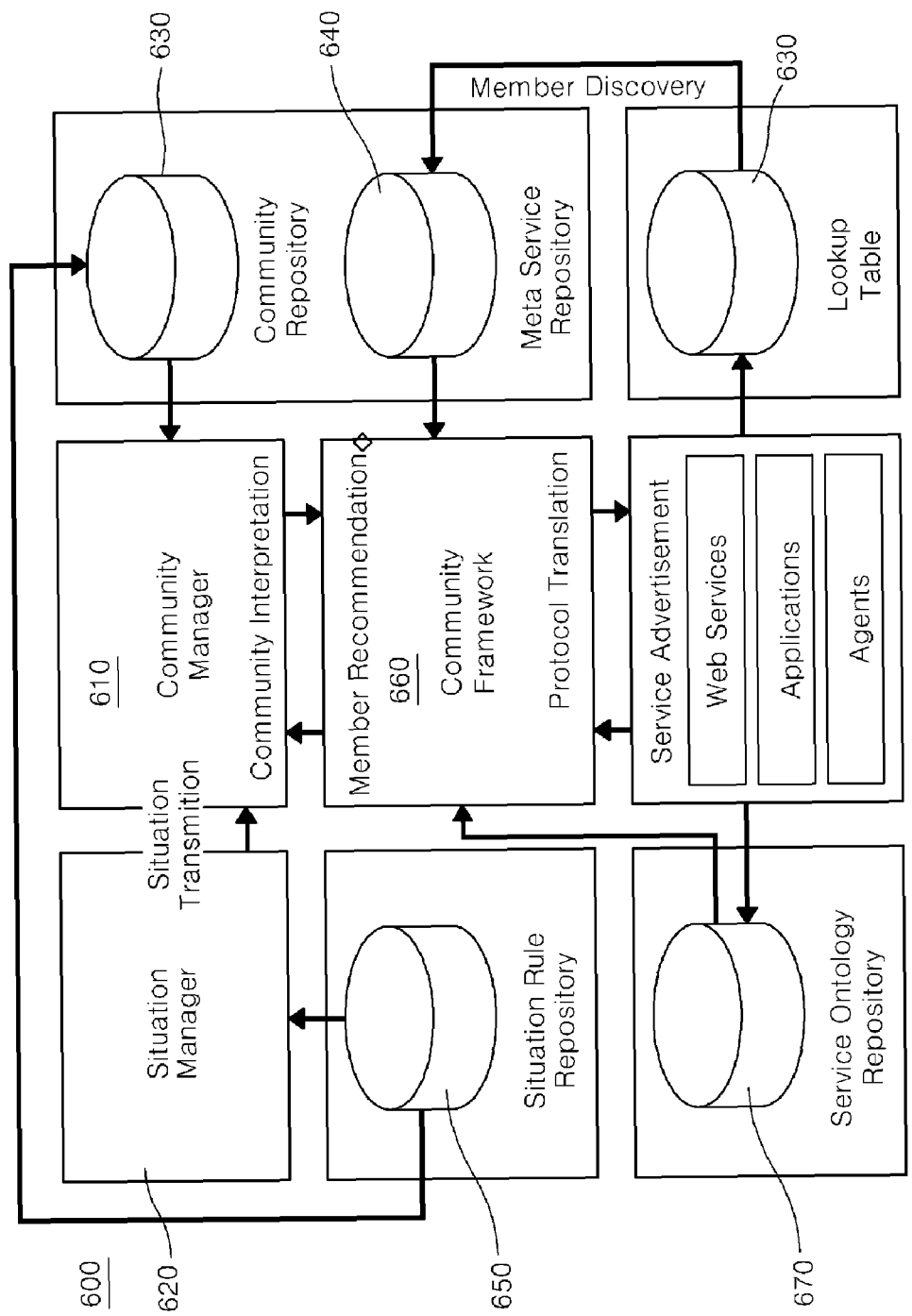
[Fig. 10]

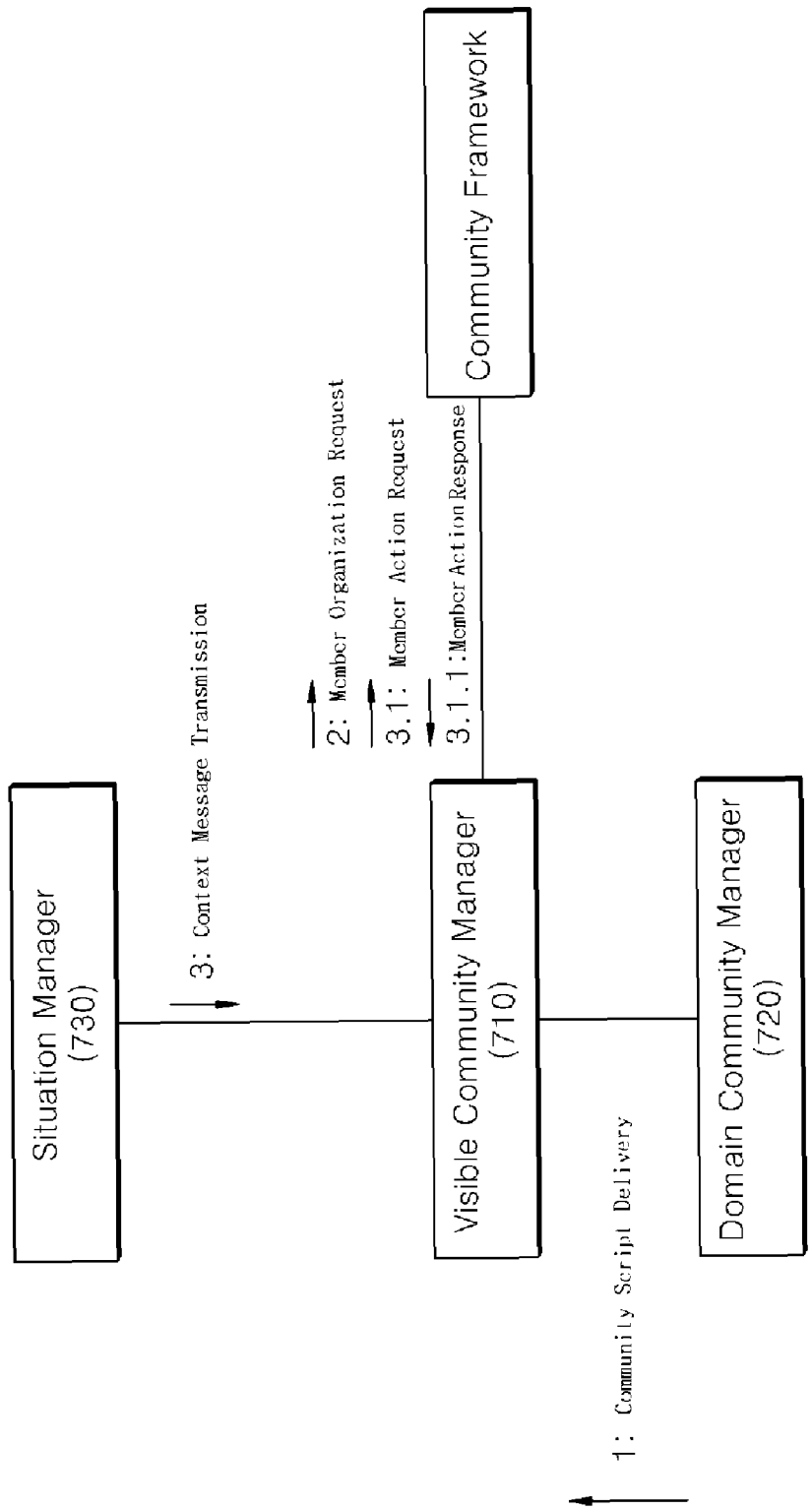
[Fig. 11]

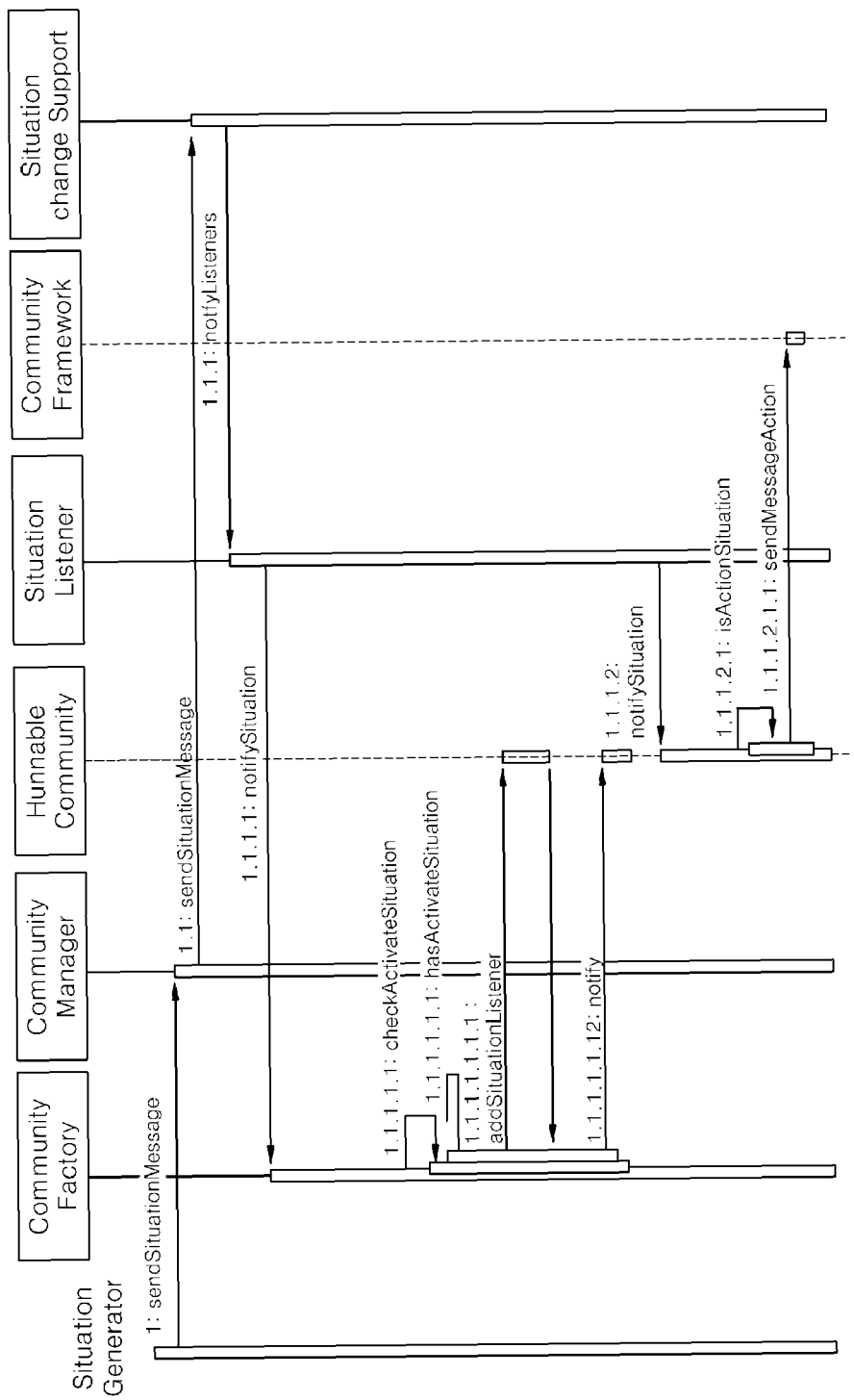
[Fig. 12]

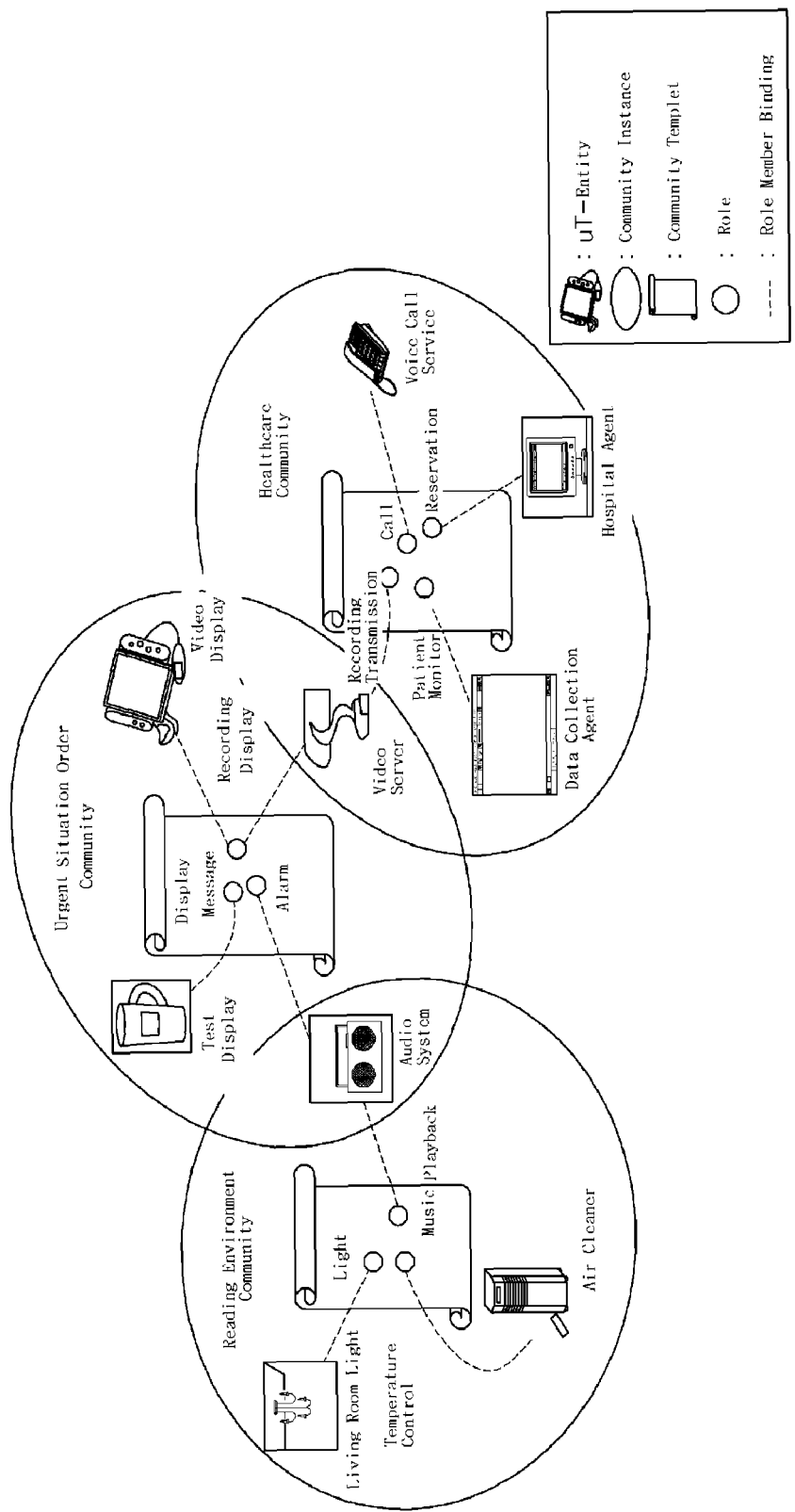
[Fig. 13]

[Fig. 14]
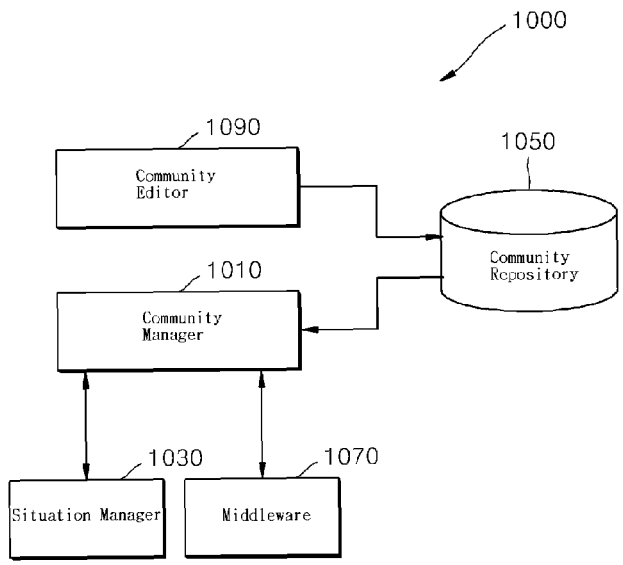
[Fig. 15]
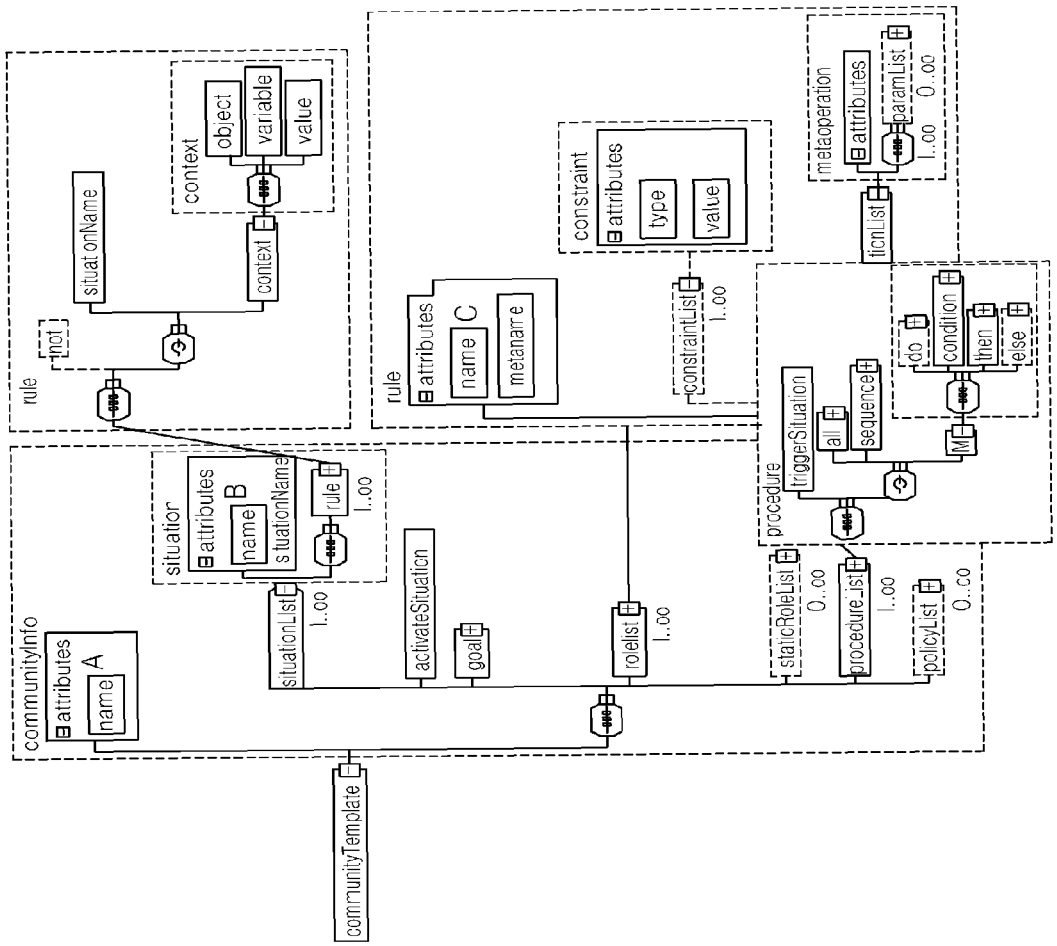

COMPUTER PROGRAM PRODUCT AND SYSTEM COMPRISING COMMUNITY MANAGEMENT METHOD

TECHNICAL FIELD

The present invention relates to community computing system and method thereof, and a method dynamically combining services in the community computing system, more particularly, to a community computing method comprising a step of community formation forming a community by defining a goal, policies, members, operations among the members, an operation situation of the community and an idle situation of the community; a step of community standby both waiting for an operation starting timing and organizing an actual community member, after the step of community formation; a step of community activation both being self activated and starting an operation, when the community operation situation is ready while the community monitors a context information, after the step of community standby; a step of community deactivation both temporarily stopping an operation for itself and waiting for a next community operation, when the community satisfies the goal of the community, or a situation to deactivate comes in, after the step of community activation; and, a step of community termination terminating all operations for itself in case the community does not need to operate any more.

BACKGROUND ART

Ubiquitous computing can be defined as a space or environment on which a man can receive services at anytime and anywhere in connecting to online network through all kinds of the terminals and objects. In order for the ubiquitous computing to be materialized, it must be required to recognize that a computer or network is the situation of human life space.

In the ubiquitous computing area, invisible computing, everywhere computing and seamless network are three (3) kinds fundamental concept. A lot of technologies have been continuously developed to actualize the concepts above. There are, for example, sensing technology, miniaturization of a device, RFID (Radio Frequency Identification) etc., but such technologies and application services have been developed for the sole mono-domain.

Objects belonging to an environment is required to unite organically and share their role in the ubiquitous computing environment in which various and complicated instruments and services are mingled, in order to provide an adequate service after detecting a user's intention. The issue of the collaboration among information, instrument and the service to be occurred at such a case cannot be ignored.

The themes to be predicted as computing issues in the coming ubiquitous computing environment would be heterogeneous environment control, conflicts resolution among ubiquitous entities, security, and the intelligence required to individual context model. Followings are illustrated in more detail.

First, in view of the heterogeneous environment control, there are diverse devices having computing power and networking function and software providing a service in the ubiquitous computing. Therefore, the protocol and network for supporting communications between those might have heterogeneity beyond the diversity. The heterogeneity requires various integration and collaboration among users, services or networks. However, the previous model for integration and collaboration could not overcome such heterogeneity.

Second, in view of the conflicts resolution among ubiquitous entities, the ubiquitous entities might have intelligence because computing transplants the diverse objects under the ubiquitous environment, or not. There has been much proposed about the collision resolution model between the objects having both similar level of intelligence and self-control. There might, however, be an issue on how detecting the behavior between the objects having different level of intelligence and self-control and solving the collision occurring between them.

Third, in view of the security, information has to be gathered and shared in order to provide both individual and autonomous service in the mobile environment. However, personal or other information relating to personal privacy might be exposed during the operation regardless of user's intention. Therefore, the new concept of security is needed for pursing two kinds of other elements such as protection of privacy intrusion and information sharing.

Fourth, in view of the intelligence required to individual context model (Defining the relationship between the data after analyzing context data), providing a service change based on the context should not only recognize the context through sensing data, but also understand various contexts for diverse users, instruments and services. For doing it, it must understand and share the context developing toward domain-centric from cross-domain.

In order to solve the issue and requirements described in the above, a community concept is introduced to the ubiquitous computing environment so that the community may need to be recreated as an organic and automatic aggregate under ubiquitous environment.

Community is defined as an assembly of either person living in the nearby area or having common concern as lexicographical meaning. It has been evolving from the community of the practical circumstance to on-line community connected by Internet.

The inventor of the present invention would solve the difficulties under the ubiquitous environment as above by designing a collaborating model in unit community in which person, computing devices and services are united organically by integrating such a community model with the ubiquitous environment.

DISCLOSURE OF INVENTION

Technical Problem

The technical task to achieve through the present invention provides an application framework system for distribution and migration for supporting users with platform independent application under ubiquitous environment, sharing computing resources through the distributed MVC Model, and guaranteeing the migration to users under ubiquitous environment.

Technical Solution

In order to achieve the technical task above, the present invention provides an community computing method comprising a step of community formation forming a community by defining a goal, policies, members, operations among the members, an operation situation of the community and an idle situation of the community; a step of community standby both waiting for an operation starting timing and organizing an actual community member, after the step of community formation; a step of community activation both being self activated and starting an operation, when the community operation situation is ready while the community monitors a context information, after the step of community standby; a step of community deactivation both temporarily stopping an operation for itself and waiting for a next community operation, when the community satisfies the goal of the community, or a situation to deactivate comes in, after the step of community activation; and, a step of community termination terminating all operations for itself in case the community does not need to operate any more.

In order to achieve the technical task above, the present invention provides a community computing system defined as an automatic collaboration model among the objects existing in the highly dispersed form under ubiquitous computing environment comprising a community manager both establishing a goal for a service and controlling service collaboration, for providing an adequate service to users based on context information, a situation rule repository storing rule applicable to respective situations, a situation manager providing the community manager with the context information being an aggregate of context data after acquiring the context information from the situation rule repository, a community repository providing the community manager with description about the community, while storing the description about the community, a Meta repository both defining and storing interfaces for respective types after classifying services into the types, and, a community framework connecting the community manager with members for achieving the goal for the service with reference to the Meta service repository.

ADVANTAGEOUS EFFECTS

As illustrated as above, as followings are advantageous effects of the community computing method according to the present invention.

Firstly, it is possible the integration and collaboration in heterogeneous dimension. The heterogeneous characteristic of objects themselves in ubiquitous environment requires integration and collaboration of various dimensions. Namely, services must be both harmoniously integrated and collaborated based on state of user, reactions of users, and context information of surrounding devices or networks, etc., when a specific service is provided for a user.

Community computing can easily lead to organic combination of the heterogeneous dimension in ubiquitous environment by mapping a "community" model of human sociology.

Secondly, it is possible capsulation of diverse information. Community computing has to define various issues as policy in the community such as unit collaboration. The issues are user's privacy caused by mobility of ubiquitous environment and temporal characteristic, collaborations among movable services, policy about service priority and collision of user preference, etc. In the meantime, the issues have to be solved in form of encapsulated in the community. Moreover, when services based on situation-aware has to be provided for the ubiquitous environment, harmoniousness for transparency and awareness is solved by community encapsulation.

Thirdly, the problem of reuse will be solved. The factor of reuse may have a great portion in the backside of the evolution of software development paradigm. Such a reuse is gradually evolved to a simple module, object, component and service and proposed. Such models, however, are not sufficient in solving new distinguishment that the ubiquitous environment has. Since community computing treats the unit of reuse as a community corporating collaboration and situation-aware, it may development of a new complex service easy in describing the community by using community technical language when software developers create new services under ubiquitous environment, and make it reuse.

Fourthly, real-time decision-making is possible. In describing the community with specified logic, the community is organized in real-time, and objects are brought in community member diversely and effectively.

Fifthly, community context sharing is possible. Domain integration may be supported by context level, since understanding and sharing of same context are possible between either community members or communities due to using Meta community context model when describing community and community members. The community computing may satisfy the basic requirements for intelligent characteristics in which ubiquitous objects have to have.

BRIEF DESCRIPTION OF THE DRAWINGS

The above and other features and advantages of the present invention will become more apparent by describing in detailed example embodiments thereof with reference to the accompanying figures, in which:

The FIG. 1 is a drawing enumerating the life cycle of a community into 5 states for realizing the community computing method according to the present invention.

The FIG. 2 is a drawing illustrated a static concept model for the community for implementing the community computing method according to the present invention.

The FIG. 3 is a drawing divided into the service community, infra community and user community for the community according to the present invention.

The FIG. 4~FIG. 6 are an exemplary drawing of the first scenario related to an automatic media service.

The FIG. 7~FIG. 9 are an exemplary drawing of a second scenario related to a health care.

The FIG. 10 is a drawing illustrating a structure of a community computing system according to the present invention.

The FIG. 11 is a drawing illustrating a mechanism in which a community is executed.

The FIG. 12 is a drawing illustrating a procedure executing a community.

FIG. 13 is a drawing for illustration of operation in which devices do dynamically binding.

FIG. 14 is a block diagram of a community computing system according to an embodiment of the present invention.

FIG. 15 is a drawing illustrating an example of the community template using in the community computing system according to an embodiment of the present invention.

BEST MODE FOR CARRYING OUT THE INVENTION

The present invention is described more fully hereinafter. The present invention may, however, be embodied in many different forms and should not be construed as limited to the embodiments set forth herein. Rather, these embodiments are provided so that this disclosure will be thorough and complete, and will fully convey the scope of the present invention to those skilled in the art.

It will be understood that when an member or layer is referred to as being "on", "connected to" or "coupled to" another member, it can be directly on, connected or coupled to the other member or layer or intervening members or layers may be present. In contrast, when a member is referred to as being "directly on," "directly connected to" or "directly coupled to" another member, there are no intervening members or layers present. As used herein, the term "and/or" includes any and all combinations of one or more of the associated listed items.

It will be understood that, although the terms first, second, third etc. may be used herein to describe various members, components, regions, these members, components, regions should not be limited by these terms. These terms are only used to distinguish one member, component, region, layer or section from another region, layer or section. Thus, a first member, component, region discussed below could be termed a second member, component, region without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, members, and/or components, but do not preclude the presence or addition of one or more other features, integers, steps, operations, members, components, and/or groups thereof.

Unless otherwise defined, all terms including technical and scientific terms used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Community may be defined as an automatic collaboration model among the objects existing as the highly dispersed form under ubiquitous environment, and community computing as the process solving the complexity and computing issues caused by the ubiquitous environment due to integrating the community with the ubiquitous computing environment.

The objects of collaborating subject are encapsulated as a community member by community skin. And, Security, QOS (Quality of Service: guarantees discriminated service quality by dynamically determining the order of priority with the community goal or the role of community internal member), policy about user preference, etc. and actions among the community members may be implemented in the community.

The information sensitive to users is not exposed to public and the dependability among the communities gets to be decreased through the community computing in which introduces the concept of community to the ubiquitous computing environment.

In order to implement such a community to the practical computing environment, it is classified into three kinds of type, user community, service community and infra community etc.

That is, community layer may be divided as an abstract model in order to support the respective heterogeneous dimension under the ubiquitous computing environment, the community characteristic in each form may be defined, and various types of software and hardware may be done mapping into these community layer, for example, device, infrastructure, Web service, agent and application, etc. While a service is provided with a user through it, the objects on the same community layer may not only provide a service organically in uniting into a community, but reflect the user's intention and environment change diversely and efficiently through the integration among the community layers.

The FIG. 1 is a drawing enumerating the life cycle of a community into 5 states for realizing the community computing method according to the present invention.

Community means an automatic collaboration model among the objects existing as the highly dispersed form under ubiquitous environment in the community computing method according to the present invention. The characteristic of the community itself will be illustrated in detail in the latter part.

In the community computing method according to the present invention, a step of community formation means the step forming a community by defining the goal, policy, members, operation among the members, operation situation and idle situation of the community. In the step of community formation, a goal may be newly established in which the community accomplishes in the ubiquitous environment, necessary services and devices may be selected for arriving the goal, and how they are cooperating may be decided. The information may be located in either global storage or local storage according to the scope of influence caused by the community.

In the community computing method according to the present invention, a step of community idle stage may refer to a step in which the community organizes actual community members and waits for an operation starting timing, after the step of community formation.

In the community idle stage, the information such as the goal in which the community has to accomplish in the ubiquitous environment, necessary services and device types for achieving the goal, and collaboration methods among themselves may be loaded from the community storage to memory. At this time, the community may search the corresponding members and organize an actual community to accomplish the goal by requesting them to join the community.

The members may refer to the objects cooperating among themselves in order to achieve the final goal pursed by the community while united in a community.

In the meantime, the community may be reorganized itself through real-time discovery for new services and devices, etc. during the time transiting from the step of community idle stage to a step of community active stage (later illustrated).

In the community computing method according to the present invention, the step of community active stage may refer to a step in which the community is self activated and starts an operation when the community operating circumstances is ready while the community monitors the context information, after the step of community idle stage.

In the step of community active stage, the community members organized in the step of community idle stage may activate and start the operation for themselves when they are in activate situation, in order to accomplish the requirements of the community described in the information such as the goal in which the community has to accomplish in the ubiquitous environment, necessary services and device types for achieving the goal, and collaboration methods among themselves.

The operation flow and information sharing, etc. of the members in the community may be decided by the policy of the community, and the step of community active stage may be continued until the state of the community members arrives to a final state, unless it is at a higher priority than the current community or is compulsorily deactivated by a community requiring emergency.

The community computing method according to the present invention, a step of community deactivating stage may refer to a step of both temporarily stopping and waiting for the next community operation in which the community stops its operation for itself when the community satisfies the goal of the community.

In the step of deactivating stage, the community may recognize that it does not need to operate itself any more through surrounding environment, and get into the deactivation state for itself.

In the community computing method according to the present invention, a step of community terminating stage may refer to a step of terminating all operations for itself in case the community does not need to operate any more.

The meaning of that the community does not need to operate any more may refer to that it combines to a new community having other goal, or it is no need due to evolution.

The step of community terminating stage may be done in various formats according to the characteristic of community. Namely, there might be a completely expiring community whose life meets its fate, or a community whose deactivating state is longlasting. In the meantime, the community may be terminated or reorganized by an object managing the community.

In the meantime, the community computing method according to the present invention may provide a user with a service, while the community passes the steps of community formation stage, the community waiting stage, community active stage, the community deactivating stage and the community terminating stage, in case of one time service.

Moreover, the community computing method according to the present invention may provide a user with a service, while the community gets in a step of community active stage at a specific situation, a step of community deactivating stage at expiring the specific situation, and regets the step of community active stage, repetitively, after passing through the steps of community formation stage and the community waiting stage, in case of non-one time service that the service type provided to user through the community is required to receptively provide a specific situation (or requesting time) like media service, or to operate the service at a specific situation from providing the service in background like security service.

As followings is illustrated about the community as an object for implementing the community computing method according to the present invention.

The FIG. 2 is a drawing illustrated a static concept model for the community for implementing the community computing method according to the present invention.

Community may refer to an automatic collaboration model among the objects existing as the highly dispersed form under ubiquitous computing environment.

Community may comprise a community goal unit containing a final goal to be achieved by the community; a community skin unit in which supports concealment of information for both privacy protection and security, and reuses a compound service defined in unit community under the computing environment to be able to open much more information by capsulating community; a community policy unit supporting the operation of the community by connecting to diverse communities as a policy aggregate about the inherent functions of the community; a community member unit cooperating among communities to achieve the final goal that the community pursues by uniting one community; and, a community action unit providing context based actions that the community member unit takes for achieving the goal of the community.

The community goal unit may contain a final goal that the community achieves.

Community and the goal of the community may be one-on-one mapping, and the goal may be differently interpreted by both the information about user's preference and surrounding situation. The situation refers to an assembly bound the state of the objects comprising the ubiquitous environment into unit time. In the meantime, the objects comprising the ubiquitous computing environment may all include users, service and infrastructure.

The goal of the community may have both a temporal typed goal in which is disappeared in achieving the goal after temporarily generated based on the type and characteristic of the community, and a permanent typed goal in which repetitively continues an operation that is activated in a specific situation and deactivated in another specific situation.

The operation classification of the community must be clarified and the level of the goal corresponding to the operation classification must be regulated, since the goal of the community is set to meet the operation classification of the community.

The community skin unit supports concealment of information for both privacy protection and security, and reuses a compound service defined in unit community under the computing environment to be able to open much more information by capsulating community.

The community policy unit supports the operation of the community by connecting to diverse communities as a policy aggregate about the inherent functions of the community.

The policy of the community is divided into a core type (the core type, as a kind of basic policy one for normally operating the community, includes security, context recognition, etc. falling in a community conceptual diagram and the option type refers to a policy type that is used in supplementing to meet the community characteristic. For example, an assert management community may supplement investment policy and risk management policy, etc.), and the policy of the core type is defined regardless of the community type. QoS, security and user preference, etc. may be defined as policy.

The community member unit refers to objects cooperating among themselves to achieve a final goal that the community pursues by being united in one community.

Community member may be user, service or infrastructure being a primitive type according to the community classification, and a community comprising these may be another individual community member.

The states of the community member may be divided into an active state activating and a waiting state deactivating in the community. The states of the community member may be described as either a specific instance naming or a requiring function other than the instance naming according to a community class. (For example, it is described in a room-telephone, big-room telephone, a schedule service executed in PDA and a schedule service executed in PC, or in telephone, schedule service, device having sound function, device having microphone function, device having display function).

The community action unit may provide context based actions that the community member unit takes for achieving the goal of the community.

Action refers to an operation the community has to perform, and the community action unit may illustrate the state of a context based community member (Action refers to an operation that either the community or community member has to perform, the action unit illustrate the context based community or community member action). It may be illustrated in a planning possible structure by defining as either rule base or states (An operation may be performed based on a rule by defining the rule of the operation to be performed by either the community or community member at a specific situation, the action of the community may be intelligently and automatically performed by describing the states of the community member and the relationship that the movement among themselves could be occurred).

In the meantime, the community as an object for implementing the community computing method according to the present invention may be divided into a service community performing collaboration among services for supporting both community user's preference and surrounding context based complex service, in organizing a community member unit with web service, application and agent service, etc.; an infra community supporting resource management, error recovery and quality control, etc. by generating a location based device group, proposing an adequate device to the service community, and performing organization of service directed community for adequate management of the service community, in organizing the community member unit with a network device comprising infrastructure and device, etc.; and, a user community performing deduction of user's requirements about both the service community and the infra community by controlling a profile about the reliability of user group and group operations, etc., in organizing the community member unit with actual operators such as family, colleagues, etc.

The FIG. 3 is a drawing divided into the service community, infra community and user community for the community according to the present invention.

The service community may perform collaboration among services for supporting both community user preference and surrounding context based complex service, in organizing a community member unit with web service, application and agent service, etc.

In the service community, web service, application and agent service, etc. providing user with a service may organize the community member unit. In describing the community, members are defined as a type rather than service instance so that the service and communities may dynamically participate in the member of the community. (For example, service type might be classified to "media player" service name to "window media player" or "GOM player" etc, service instance to 'Window media player executing in a room PC' or 'Window media player executing in a big room PDP'; It is a mechanism in which the member is described into only either service name or type at the step of community formation stage, but organized into a community member after searching an adequate service instance by situation at the steps of both waiting and active stage so that it may support a mobile adhoc environment in which the service instances discovered are changed at every moment; The previous service discovery and service operation technology are done by unit of service instance.)

The infra community may support resource management, error recovery and quality control, etc. by generating a location based device group, proposing an adequate device to the service community, and performing organization of service directed community for adequate management of the service community, in organizing the community member unit with a network device comprising infrastructure and device, etc.

Physical devices such as all computers, home appliance devices, media and sensors having both computing function and networking capability may organize the infra community. A location-based community may be locally defined and generated in advance, and a service-oriented community based on context may be organized, for supporting resource management, self-treatment, self-recovery, etc. of the physical devices.

Namely, there may be two types in the infra community, a location-based community and a service-oriented community.

The user community may perform deduction of user's requirements about both the service community and the infra community by controlling a profile about the reliability of user group and group operations, etc., in organizing the community member unit with actual operators such as family, colleagues, etc.

The user community, as a community connecting to an actual user group, may describe family and colleagues, etc. so that it may be applied to deduce the requirements of both the service community and the infra community. In the meantime, the members of the user community may be mapping with services of the service community or the devices of the infra community.

Three communities as above may be designed to do mapping different types of service and device to the respective classes in abstract level. For example, an agent is not only mapped to the service community, but also various forms of service such as application, web-service, etc. may be located. It may be defined in consideration of future expansibility.

The community as an object for implementing the community computing method according to the present invention may change and evolve through self-studying in the process that the community is activated and achieves a goal. As following is the illustration of the change and evolution of the community according to the present invention.

Firstly, there is a change and evolution in view of the community goal.

The community goal may be differently interpreted by both user's preference and environment context. The community goal may change itself to not only a simple change as a view of the interpretation, but also an adaptive change in which the goal itself would be more intelligent to meet a situation according to the modifications of community components or change of physical environment. Since this case does not develop to other directions than the community goal, a new community may not be generated and a community of evolved form is organized based on the previous community.

Secondly, there is a change and evolution in view of the member role.

Even though the goal pursued by the corresponding community does not change, the role of the member who participates in the community can be changed according to the modification of configuration of the ubiquitous computing environment. The procedure and policy performed by the community may be also changed by such a change in the role of such members. And, through such a process, the community will evolve for itself.

As a computing methodology, the community computing will be implemented by a plurality of community management systems supporting community computing, by being connected to a device in form of middleware, or by development methodology with the help of community technical language, community compiler and development environment.

The community management system may recognize context and support interaction among the community members in message-based communication. Service developer may generate a community description and load it to a system, in order to generate a community.

The community management system may keep the information of user community into a profile repository for user group, and use any corresponding information by reading it from the repository. Moreover, since the community management system does separately keep the personal information such as individual user's preference and schedule information, etc., the personal information will be used in establishing the goal of the community or deciding the action of the community.

The community management system is divided into a mobile and domain types. Critical components such as community monitor and goal interpreter, etc., and a personal information repository may be loaded to the mobile typed community management system. On the other hand, components other than the critical components, for example, service discovery or device discovery, and, repositories except the personal information repository may be loaded to the domain typed community management system.

The scenario below illustrates a mechanism both driving and maintaining the community with the community management system of the first alternative.

The first scenario is an automatic media service, and the FIG. 4~FIG. 6 are an exemplary drawing.

Below is illustrated for a situation in which a user is provided with both a telephone call service without interruption and a media service on the way to a rest room, in case that there is a phone call, while he(she) is watching television set at a living room.

[1] As soon as a user sits on a sofa, a service community management system proposes the user to watch media service after deducing the situation of the user, with the current time and the schedule information of the user. Upon the user's affirmation of watching the media service, the service community management system may inform the media service of playing a specific media, after searching the information of user preference.

[2] An infra community management system recommends television set located in the nearest place from the location of the user to the service community management system, and the media service is played back to the television set. A follow-me media community is activated by playback situation of the media service.

[3] When a call comes in, the telephone being nearest to the user rings.

[4] The service management system recognizes that the telephone is ringing, with the help of a sound-sensing sensor.

[5] The service community management system supplements a telephone service of a sound generating origin service to a community member, and detects the priority of two services in order to solve sound collision with the media service so that it informs the media service having a lower priority of turning down the sound.

[6] The media service turns down the sound of the television set that the current media is playing back.

[7] While the user is having a phone call, he(she) moves to a rest room. When he(she) gets in the rest room, a location service sends the location change of the user by a notice message. Both the media service and telephone service being current available services will receive the notice message. The infra community management system recommends that magic mirror, wireless microphone and speaker be used among the devices controlled by a rest room community.

[8] The media service continuously plays back the media that the television set is playing back, through the magic mirror that is possible to play back in media, at the rest room. The telephone service is continuously supported by the wireless microphone and speaker in the rest room.

In order to provide services without applying the community computing method according to the present invention under the scenario above, the respective services have to be newly developed so as to intelligently provide corresponding fitting services after checking the user preference and surrounding situations, and either a new integration system or collaboration service has to be developed by service scenario, in order to solve the collision among services.

However, a user may be provided with a discriminated service in which provides the collaboration among the previously existing services in context base, in applying the community computing to the scenario above. Moreover, it may provide that services are dynamically bound in selecting the most adequate device, whenever the location of the user changes, rather than binding both the services and devices unchangeably. Therefore, a context based complex service may be easily developed so that the dynamic integration and collaboration are supported and the problem such as the service collision occurring among the services will be resolved.

The second scenario is related to a health care, and the FIG. 7~FIG. 9 are an exemplary drawing thereof.

Below is illustrated for a scenario solving an emergency situation by organizing an environment and services to cope with the emergency situation such as notification to user's family and caring him(her), in case the emergency situation is occurred to him(her).

[1] A user is sitting on a sofa in a living room and watches television set.

[2,3] As soon as a heartbeat-measuring device detects an abnormal sound, a heartbeat sensing service informs a care service of the situation.

[4] If a profile information of both family community and health-care community is transferred to an infra community management system, the infra community management system organizes a health-care network with a network-possible device located at the nearest to the user.

[5] The care service informs his(her) family doctor of the information related to his(her) heart.

[6] The family doctor who receives the emergency situation instructs him(her) to keep to his (her) bed after having a household medicine as a countermeasure and sets a doctor's appointment.

[7] A reservation & treatment service informs the care service of the situation.

[8] The care service sends a message in which take him (her) the household medicine and keep to his(her) bed, to a monitor of his(her) grandson in other room. And, the service community management system requests his(her) daughter who is living around to take him to the hospital as scheduled, after comparing the location information of his children with the schedule.

According to the community computing method of the present invention, it is possible that a countermeasure for an emergency situation is accomplished without delay based on the context information by checking the location and reachable devices of, organizing a health-care network, and informing them of the emergency situation, based on the information of the user community, when the user have the emergency situation.

The FIG. 10 is a drawing illustrating a structure of a community computing system according to the present invention.

In order to implement a ubiquitous an intelligent space, it is important that all elements comprising the space, for example, device, system and service intelligently operate in response to the context of the user. It is also important for the respective diverse objects to collaborate in order to provide an efficient service to users.

The subject to be collaborated may be varied by the situation of the user, surrounding environment, and the context such as characteristic of the user and user preference. The goal of service may also be varied.

In order to implement a dynamic collaboration service supporting both the goal of service and the adaptability of collaboration subject according to the mobility of users and diverse environments, a system is needed in which defines the community as a highly abstract layer typed community by using the community in Metaphor of unit collaboration, and provides the user with a service in which connects it to the practical service collaboration flow of physical space.

Individual user may be provided with a complex service that meets his preference in real-time even during his unawareness or at mobile space, by the development of the system.

Moreover, enterprise or authorities providing services may reuse the previously established services, and provide a new service in which assembles organically to meet user's situation in real-time through simple description to the community for which service is to be the subject of collaboration.

In order to provide users with a context recognition complex service under community computing environment, a manager is required for which generates and manages a community in response to a context, sensitively. The manager may support interaction for which the respective service applications achieve a common service goal, and control any collision occurring at such collaboration, and provide an adaptive service according to user preference. The manager who can satisfy such functions is a community manager. As followings is illustrated about a community computing system incorporating the community manager.

A community computing system 600 in the FIG. 10 may comprise a community manager 610, a situation manager 620, a community repository 630, a Meta service repository 640, a situation rule repository 650 and a community framework 660 in a computing system of community defined as an automatic collaboration model among the objects existing in the highly dispersed form under ubiquitous environment.

The FIG. 10 proposes a lookup table 680 and a service ontology repository 670 in which store the information of both applications and members corresponding to the objects, for understanding of the operation of the community computing system 600.

The community manager 610 may control a service collaboration for providing an adequate service to users based on a context information. The community manager 610 may be organized in both domain and user instance. As followings is the mechanism operating under such an environment.

The community manager 610 may receive a context information being an aggregate of context data from the situation manager 620, establish a goal for user services, and collect members to achieve the goal through the framework.

The group of the members is called to a community, and the community manager 610 may provide a dynamic collaboration solution like a member action request and a member call, etc. through a policy module such as a policy injection and a policy repository, etc, in order to achieve the goal of the community. If the goal of the corresponding community is determined to achieve the goal of the community by the context information, the community will be expired or deactivated. The community manager 610 may be classified in a mobile community manager incorporated in mobile device and a domain community manager incorporated in a domain server.

It is assumed that the mobile community manager is movable since it is incorporated into a device supporting mobility. The mobile community manager may have a user profile repository containing user information, preference, job priority and known community manager list, etc., and a module for authentification.

Moreover, the mobile community manager searches corresponding domain community manager, performs a modification process about service list to be received from the corresponding domain and action to provide services, and then directly carries out the service or through the domain community manager.

The domain community manager is a server program supporting services in a specific domain. It monitors context information in the corresponding domain, and keeps both communities to be able to perform in the domain and policies to be held.

The domain community manager may send a community script to a manager, carries out job performed by community, and provides a function of monitoring communities performing in the domain.

The domain community manager may define community, unit of collaboration service, as an abstract layer, describe it as meta service so as to be able to interpret at executing time, and convert it to a physical service. In doing that, the computing system 600 may deduce a conceptual model of the community, and define the language describing community as a community schema based on it. And, the computing system 600 may comprise a meta service repository 640 in which both declares and stores meta services referenced in describing the community fitting the specification of the defined community schema.

As followings is illustrated about community specification.

A community may comprise a goal, activate situations, deactivate situations, Members, Actions and Policies. Namely, the components to organize the community are a goal, situations in which the community either activates or deactivates for achieving the goal, community members and the actions and policies of the community.

The community and the goal of the community are a one-on-one mapping. The goal of the community may be described into a description that is differently interpreted by the information of user preference and surrounding situation.

The goal of community may have both a temporal type in which is disappeared in achieving the goal after temporal generating based on the type and characteristic of the community, and a permanent type in which repetitively continues an operation that is activated in a specific situation and deactivated in another specific situation.

Establishment of the goal, since being equivalent to level for the action of community to be operated, may be classified in detail and standardized in the level.

The situation refers to an assembly united the states of the objects organizing an environment in the base of time. The objects organizing an environment may all comprise users, services and devices.

The type of the Members may be users, services or devices, being a primitive type according to the community classification, and communities as each group comprising them, respectively. The states of the Members may be divided into an operating state activated and a waiting state deactivated, in the community. The states of the Members may be described as either a specific instance or a type of requiring function other than the instance according to a community class.

The Actions, operations that a community has to perform, may describe the states of a context based community member. It may be either defined as rule base or states, so that it may be described in a planning possible structure.

The Policies may be divided into a core type and an option type. The Policies of the core type must be defined regardless of the type of a community. QoS, Security and User Preference, etc. may be defined as the Policies.

Since nobody knows at describing a community about which services are Members and how the interface of the services are, the services may be classified into types, defined meta service interface of the respective types in advance, and described with reference to API (Application Program Interface) format.

The meta services described as above may be substituted for actual service instances at executing time by the community manager. Since the meta service can be defined as various and enormous amount according to both service classification method and domain, it must be defined in Java interface, and its Semantic must be understood with reference to Java API on Web.

The previous collaboration and integration of services are implemented in static service discovery and the execution of the service. However, it is required a technology transferring a service execution goal with the interface that the community members can understand, by making dynamically discovery the community Members of the collaboration service subjects, and admitting a rule to them, in order to support the diversity and mobility of environment incorporating ubiquitous intelligent space in which the community manager system will be operated, and target service execution through selection of optimised collaboration subjects.

Therefore, a community manager 610 is needed for interpreting the described community script, organizing the community at executing time dynamically, requesting necessary actions by the respective interfaces and protocols used by the services being the community Members.

The organization of the community may be implemented through the interlocking between the community framework 660 and a middleware based on the community script at executing time. The community framework 660 may collect services by using a discovery function of the middleware, and recommend the community manager 610 to decide whether the services are adequate to regulations of the community Members, through test and negotiation.

Types and regulations of the Members to be organized are described in the community script, and the currently defined regulations are described in the community schema.

The protocol is used with XML message in which "service_type" is a value of key, when recommendation of the community Members is requested through the community framework 660. The community framework 660 may keep its internal service table after collecting look-up tables of the middleware, and recognize based on the information collected about which "service_type" the respective services are.

Moreover, a service look-up protocol is configured to include "constraint". This item is summarized as the "constrains" after collecting the policies of members organization among the community policies described in the respective community scripts. For example, it contains the regulations that the community Members have to keep, "the nearest to the location of an user" and "greater than security level 3" etc.

Therefore, the selecting basis of Members for organization of a community may be "service_type" and "constraints". A community is organized with the members recommended by the community framework 660, and the service flow describing in the community script is converted to fit the interfaces of the members organized.

The community descript described in Meta service has to be operated by mapping with physical services after interpreting in executing time. For doing that, personal context being a critical element to determine the organization of community member and the goal of service is established in OWL (Ontology Web Language) storage place by using Protege, and referenced by querying and using Jena Java API after converting it to RDF (Resource Description Framework) file. Through the structure, all variables starting with '$' in the community script will be substituted for a specific value so that Semantic interpreting the goal and interface of services will be understood.

A mechanism in which a community is executed is shown in the FIG. 11. When community managers 710 and 720 receives a context message from a situation manager 730, it compares with a context message of a community script loaded, and executes a request for either organization of a specific community or actions of the members, etc.

There are two types of executions of community. One type is related to the community members such as a request for a specific action to services being members, or transfer of information, etc., and the other is directly related to the community manager 710 and 720 such as controlling the states of the respective community managers, internal timer generating, execution of a specific action, etc.

As shown in the FIG. 12, it is illustrated a procedure executing a community. A Community Loader loads and interprets community script, and sends it to a Community organizer. Then, it organizes a community with the help of the community framework 660.

During the process, scripts are interpreted for both the goal of the community and service execution method, the members organized may be modified for fitting interface of the actual services, and the respective communities may be operated in driving with Java's thread object.

The respective community threads may hear the context messages delivered from the Situation manager 620 through a Situation Listener, and operate according to the actions of the community interpreted, just in case that the message is related to actions of the corresponding community. For example, if the message delivered is a trigger message requesting action of the member having a specific rule of the community, it sends such an action to the corresponding member. During the process, it would be the community framework 660 that sends a protocol in which the corresponding member can understand.

As illustrated above, the community computing system may provide that the community achieves the purpose of the community in operating the members organizing the community by using a context information from the context manager.

In another embodiment of the present invention, a service may be provided with a user by modelling the service as a community, defining a role model necessary for the community, and binding actual devices performing the role model with a runtime, in ubiquitous environment. For doing it, the present invention may use a concept of community template. The community template may not only define a service provided with a user to a conceptual community, but what jobs to be done for achieving the purpose of the community in response to role models necessary for the community and context information of the role models. It will be illustrated about the community computing system according to an embodiment of the present invention and the operation hereof.

Conventional service combination systems publish in advance about how services subject to combination would be called for and also how the services subject to the combination would be organized. Therefore, these items should be defined in advance at developing time. However, for providing the user with a collaboration service in the ubiquitous environment, the services subject to combination may be needed to modify fitting for changed environment.

In the meantime, individual may perform other various roles in diversified communities according to characteristic of the community in view of a social community concept. Similarly, computing devices existing in everywhere may dynamically perform various roles according to the capability of a device and characteristic of services operating in the device in ubiquitous environment using the community computing concept.

FIG. 13 is a drawing for illustration of operation in which devices do dynamically binding. The FIG. 13 illustrates three exemplary communities, reading environment community, emergency instruction community and health control community. Hereinafter, the reading community will be illustrated in detail.

The reading environment community defines a service for providing reading environment. Moreover, the community defines its necessary roles as three role models, illumination, temperature control and music reproduction. The three role models may be defined with both a meta service described in ontology and user context based conditions.

The reading environment community may search service devices responsible for the respective role models at executing by the community manager. In general, the reading community may search a service device located at the nearest to a user. For example, in case of the role model of illumination, the reading environment community may search a service device located at the nearest one to the user among illumination service devices controlling illumination. If the searching says the nearest service device to be the lighting in a living room, the community member would be the lighting in the living room. If the user moves to an inner room while reading continuously, the service device nearest to the user would be the lighting in the inner room, accordingly, the member of the community would be the lighting in the inner room, capable of performing the same role.

In the meantime, since job process is in general unified in an enterprise, the job process is not required to alter according to characteristics of users and changes of environment. Therefore, the conventional service combination systems usually define a business flow by using BPEL (Business Process Execution Language). However, computing devices and services are existing in everywhere, accordingly, service combination system whose subject would be users may diversely change the services subject to combination and service flow according to changes of users and environments context in the ubiquitous environment.

In the present invention, the context rule should be registered first of all in order to recognize a situation dynamically changing. Then, the present invention transmits a result about whether a sensed context corresponds to the registered rule, as a context information. Finally, it controls and executes the service flows in response to the context information transmitted.

FIG. 14 is a block diagram of a community computing system according to an embodiment of the present invention.

The community computing system 1000 may comprise a community manager 1010 and a context manager 1030. The community manager 1010 may load a community template.

As illustrated above, services providing to users should be defined as communities in the community template being community describing information. A goal of the community, context list, role models and operations to be performed by the role models to achieve the goal of the community are also defined in the community template. Moreover, the community template in the present invention may be described with a predetermined community schema language with reference to a predeclared meta services, but those skilled in the art may recognize that the present invention should not be construed as limited to the method described above. As it is illustrated the community describing configuration with a predefined community schema with reference to meta services, the detailed explanation will be omitted.

FIG. 15 is a drawing illustrating an example of the community template using in the community computing system according to an embodiment of the present invention. As illustrated in the FIG. 15, the community template may comprise a community name (A) defining services providing to users. The community template may also comprise a context list, activeSituation, community goal, roleList, procedureList. It may also further comprise staticRoleList and Policylist, as an option. With respect to the list included in the community template, any corresponding parts will be illustrated in more detail while illustrating FIGS. 14 and 15.

After loading the community template, the community manager 1010 may interpret the community template loaded and transmit the situation rule included in the community template to a context manager 1030.

As followings are the situation list in the community template by the interpretation of the community manager with reference to FIG. 15. The situation list may comprise a situation list name (B) and a situation rule. The situation rule may be defined as a rule included in the situation list, and the situation rule may be displayed with a rule of the situation list. The situation rule may comprise a situationName and a context organizing the situation rule. The context may comprise an Object, a Variable and a Value. Therefore, a situation to be registered may be defined with the Variable about the Object and the Value of the Variable.

The situation manager 1030 may register the situation rule received, and transmit a situation to the community manager 1010 in case that the situation corresponds to the situation rule registered.

In an embodiment of the present invention, the community computing system 1000 may further comprise a means to edit the community template. The present invention illustrates that the community template is edited by using a community editor 1090, As illustrated above, the community template may be edited by the method described with the predefined community schema language with reference to the predeclared meta services. Such a community template editing may be accomplished in the community editor 1090. The community editor 1090 may store the community template edited to the community repository 1050.

As illustrated in FIG. 15, the community template may comprise the roleList including role Lists for implementing any necessary roles in order to achieve the goal of the community. The community template may comprise a plurality of roleList, and the roleList may be defined with reference to the meta services predeclared.

Referring to FIG. 15, the roleList may comprise rolemodelName, metaName corresponding to the rolemodelName and constraintList. The constraintList may comprise constraintList type and constraintList type. Namely, the role model may be defined as the rolemodelName and included in the community manager. And, the rolemodelName will be corresponded to the meta services predeclared so as to find a service providing at actual environment.

In the meantime, the community computing system 1000 may further comprise a middleware 1070 in which searches a service member corresponding to the role model and transmits the service member searched to the community manager 1010.

As followings is the operation between the community manager 1010 and the middleware 1070. First, the community manager 1010 may transmit a searching instruction to the middleware 1050 to search a member corresponding to the role model in response to context information received from the context manager 1030. The middle ware 1050 receiving the searching instruction may search a service member corresponding to the role model in response to the searching instruction. At this time, the middleware 1050 may search any service available devices by using information included in the roleList, for example, the rolemodelName and its corresponding meta service name. It may do searching with reference to the constraintList.

The middleware 1050 may transmit the services searched to the community manager 1010 as a service member corresponding to the role model. In the present invention, an operation of which the middleware 1050 transmits the services searched to the community manager 1010 is an operation of recommending service available devices, and the community manager 1050 may select a service member with a most suitable device to the current situation among the devices transmitted (recommended) from the middleware 1050.

In the meantime, the community template may comprise a procedureList for defining the context information in which the community operates actions performed by the role model. Referring to FIG. 15, the procedureList may comprise a triggerSituation and actions performed by the role model in accordance with the triggerSituation. Followings is a configuration of the community manager 1010 for performing the actions to accomplish the goal of the community by using the procedureList.

In case receiving a context information corresponding to the triggerSituation, the community manager 1010 may provide a service of corresponding triggerSituation. In other words, after the community manager 1010 selects a most matchable device to a role model under current ubiquitous situation among the searched devices received by the middleware 1050, the selected device may do binding with the role model as a service member. Then, the community manager may have the binding service member operate according to the procedureList.

Service providing operation is illustrated before that a community computing system registers a context rule, searches a service available devices at occurring a situation corresponding to the context rule registered, and do binding with a role model, so that a service can be provided with users. However, those skilled in the art will readily appreciate that other specific modifications of the community computing system are applicable to the community computing system shown in FIG. 13. For example, the community computing system may comprise a community simulation unit so as to prove operations of the community computing system in advance. Moreover, the community computing system may further comprise a community monitoring unit monitoring operating process of the community computing system for convenient restoring any trouble.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

INDUSTRIAL APPLICABILITY

The present invention may be used for the networking field between the systems related to the computer network, especially, the ubiquitous computing.

The invention claimed is:

1. A computer program product comprising a non-transitory computer usable medium having a computer readable program code embodied therein, wherein the computer readable program code is adapted to implement a computing method comprising: forming a collaboration by defining a goal, policies, members, operations among members, an operation situation and an idle situation, wherein the collaboration comprises: a skin unit supporting concealment of information for privacy protection and security; a goal unit containing a final goal to be achieved by the collaboration; a policy unit supporting operation of the collaboration by diversely connecting to collaboration as a policy aggregate about the inherent functions of the collaboration; a member unit cooperating among collaborations to achieve the final goal that the collaboration pursues by uniting into one collaboration; an action unit providing context based actions that the member unit performs for achieving the goal of the collaboration; a service community performing collaboration among services for supporting user preference and surrounding context based complex surrounding, in organizing the member unit with a web service, application and agent service; an infra community supporting resource management, error recovery and quality control by generating a location based device group, proposing an adequate device to the service community, and performing organization of a service direct community for adequate management of the service community, in organizing the member unit with a network device; and a user community performing deduction of user's requirements about the service community and the infra community by controlling a profile about the reliability of user group operations, in organizing the member unit with actual operators; waiting for an operation starting time and organizing at least one of the members; activating and starting an operation, when the operation situation is ready while the collaboration monitors a context information; temporarily stopping an operation and waiting for next operation, when the collaboration satisfies the goal, or a situation to deactivate comes in; and terminating all operations when the collaboration does not need to operate any more.

2. The computer program product of claim 1, wherein the infra community comprises a location-based community and a service-oriented community.

3. The computer program product of claim 1, wherein the goal unit has a permanent typed goal repetitively continuing a state that is activated in a specific situation and deactivated in another specific situation.

4. The computer program product of claim 1, wherein the goal unit has a temporal typed goal which is temporarily generated based on the type and characteristic of the collaboration.

5. The computer program product of claim 1, wherein the member unit comprises a user, a service and an infrastructure as an object, and a group comprising the user, the service and the infrastructure as another object.

6. The computer program product of claim 1, wherein the collaboration changes and evolves through self-study as the collaboration achieves the goal.

7. The computer program product of claim 1, wherein the terminating all operations comprises expiring the goal and completing collaboration termination.

8. The computer program product of claim 1, wherein the collaboration does not terminate, but remains deactivated.

9. The computer program product of claim 1, wherein the collaboration provides a service only one time.

10. The computer program product of claim 1, wherein the collaboration provides a service, while the collaboration activates at a specific situation, deactivates at expiring the specific situation, and reactivates at another specific situation, repetitively after forming and waiting, wherein the service is a non-one time service provided to a user through the collaboration and is required to repetitively provide a specific situation or requesting time.

11. A computing system comprising a non-transitory computer usable medium having a computer program code embodied therein, wherein the program code comprises: a community manager establishing a goal for a service and controlling service collaboration; a situation rule repository storing rule applicable to respective situations and context information; a situation manager providing the community manager with the context information being an aggregate of context data after acquiring the context information from the situation rule repository; a community repository storing description about a collaboration comprising members and providing the community manager with the description about the collaboration, wherein the collaboration comprises: a skin unit supporting concealment of information for privacy protection and security; a goal unit containing a final goal to be achieved by the collaboration; a policy unit supporting operation of the collaboration by diversely connecting to collaboration as a policy aggregate about the inherent functions of the collaboration; a member unit cooperating among collaborations to achieve the final goal that the collaboration pursues by uniting into one collaboration; an action unit providing context based actions that the member unit performs for achieving the goal of the collaboration; a service community performing collaboration among services for supporting user preference and surrounding context based complex surrounding, in organizing the member unit with a web service, application and agent service; an infra community supporting resource management, error recovery and quality control by generating a location based device group, proposing an adequate device to the service community, and performing organization of a service direct community for adequate management of the service community, in organizing the member unit with a network device; and a user community performing deduction of user's requirements about the service community and the infra community by controlling a profile about the reliability of user group operations, in organizing the member unit with actual operators; a meta service repository defining and storing interfaces for respective types after classifying services into the types; and a community framework detecting members for achieving the goal for the service by referring to the meta service repository and connecting the community manager with the detected members.

12. The computing system of claim 11, wherein the community manager comprises a mobile community manager incorporated in a mobile device and a domain community manager incorporated in a domain server.

13. The computing system of claim 12, wherein the mobile community manager comprises a user profile repository containing user information, preference, job priority and a known community manager list information, and a module for authentication incorporated into a device supporting mobility.

14. The computing system of claim 12, wherein the domain community manager is a server program supporting services in a specific domain.

15. The computing system of claim 11, wherein the meta service repository declaring and storing meta services referenced in describing a community fitting specification of community schema that is language to describe the collaboration.

16. The computing system of claim 11, wherein the community manager comprises:
  a situation observer monitoring the context information received from the situation manager and checking whether or not it is identical to trigger situation;
  an organizer interpreting the collaboration and organizing members after loading community scripts at runtime;
  a runnable controlling execution and states of the organized collaboration; and
  a context converter transmitting a message to the community framework after converting an executing message described in the meta service to the message understandable to a corresponding service.

17. A computing system comprising a non-transitory computer usable medium having a computer program code embodied therein, wherein the program code comprises: a community manager loading a community template, in which a service provided to a user is defined as a collaboration, analyzing the community template, and transmitting a situation rule included in a community template, wherein the collaboration comprises: a skin unit supporting concealment of information for privacy protection and security; a goal unit containing a final goal to be achieved by the collaboration; a policy unit supporting operation of the collaboration by diversely connecting to collaboration as a policy aggregate about the inherent functions of the collaboration; a member unit cooperating among collaborations to achieve the final goal that the collaboration pursues by uniting into one collaboration; an action unit providing context based actions that the member unit performs for achieving the goal of the collaboration; a service community performing collaboration among services for supporting user preference and surrounding context based complex surrounding, in organizing the member unit with a web service, application and agent service; an infra community supporting resource management, error recovery and quality control by generating a location based device group, proposing an adequate device to the service community, and performing organization of a service direct community for adequate management of the service community, in organizing the member unit with a network device; and a user community performing deduction of user's requirements about the service community and the infra community by controlling a profile about the reliability of user group operations, in organizing the member unit with actual operators; and a situation manager receiving and registering the situation rule, and transmitting a situation to the community manager as a situation information when the situation falls into a registered situation rule.

18. The computing system of claim 17, wherein the community template comprises a situation list including the situation rule.

19. The computing system of claim 18, wherein the community template further comprises a role list which includes a goal and role models for performing roles necessary for achieving the goal.

20. The computing system of claim 18, further comprising a middleware which searches a service member corresponding to the role models, and transmits the service member searched to the community manager.

21. The computing system of claim 18, wherein the community manager transmits the middleware a searching instruction searching members corresponding to the role models in response to the situation information, and the middleware searches the service member corresponding to the role models in response to the searching instruction.

22. The computing system of claim 21, wherein the community template further comprises a procedure list which performs a trigger situation triggered at receiving the situation information operating the community, and has the role models performing actions in response to the trigger situation.

23. The computing system of claim 22, wherein the community manager binds a service member corresponding to the role models, and the service member bound operates based on the procedure list.

24. The computing system of claim 17, further comprising a community repository storing the community template, and wherein the community manager loads the community template from the community repository.

25. The computing system of claim 24, further comprising a community editor editing the community template and storing the edited community template into the community repository.

* * * * *

UNITED STATES PATENT AND TRADEMARK OFFICE
CERTIFICATE OF CORRECTION

| | |
|---|---|
| PATENT NO. | : 7,849,136 B2 |
| APPLICATION NO. | : 12/160334 |
| DATED | : December 7, 2010 |
| INVENTOR(S) | : Weduke Cho et al. |

It is certified that error appears in the above-identified patent and that said Letters Patent is hereby corrected as shown below:

The Specification should be amended to:

(1) Column 1, line 5, add the following Cross Reference to Related Applications to the patent immediately before the section title Technical Field of U.S. Patent No. 7,849,136 B2

(2) Column 1, line 7, Claim 5, add the following This application is a 371 of PCT International Application No. PCT/KR2007/00088 filed January 5, 2007, published as WO2007/081118 on July 19, 2007, which claims priority to Korean Patent Application No. 10-2006-0002853 filed January 10, 2006, and Korean Patent Application No. 10-2007-0001640 filed January 5, 2007. The disclosures of the above applications are incorporated herein by reference.

(3) Column 1, line 20, replace context information with context of information

(4) Column 1, line 39, replace concept with concepts

(5) Column 1, line 56, replace Followings are illustrated with Following are illustrations

(6) Column 2, line 4, replace ubiquitous environment, or not. with ubiquitous environment.

(7) Column 2, line 39, replace designing a collaborating model in unit community in which with designing a collaborating model in unit community in which each

(8) Column 2, line 59, replace an with a

(9) Column 3, line 22, replace repository providing the community manager with description with repository providing the community manager with a description

(10) Column 3, line 32, replace As illustrated as above, as followings are advantageous with As illustrated above, the following are advantageous

Signed and Sealed this
Seventh Day of June, 2011

David J. Kappos
*Director of the United States Patent and Trademark Office*

CERTIFICATE OF CORRECTION (continued)
U.S. Pat. No. 7,849,136 B2

(11) Column 3, line 33, replace effects of the community computing method according to with effects of the community computing method according to embodiments of

(12) Column 3, line 54, replace in form of encapsulated in the community, with in the form of encapsulation in the community.

(13) Column 4, line 22, replace The FIG. 1 with FIG. 1

(14) Column 4, line 25, replace The FIG. 2 is a drawing illustrated with FIG. 2 is a drawing illustrating

(15) Column 4, line 29, replace The FIG. 3 with FIG. 3

(16) Column 4, line 32, replace The FIG. 4 ~ FIG. 6 are an exemplary drawing of the first with FIG. 4 ~ FIG. 6 are an exemplary drawings of the first

(17) Column 4, line 34, replace The FIG. 7 ~ FIG. 9 are an exemplary drawing of a second with FIG. 7~ FIG. 9 are an exemplary drawings of a second

(18) Column 4, line 36, replace The FIG. 10 with FIG. 10

(19) Column 4, line 38, replace The FIG. 11 with FIG. 11

(20) Column 4, line 40, replace The FIG. 12 with FIG. 12

(21) Column 4, line 48, replace using with being used

(22) Column 4, line 61, replace an with a

(23) Column 5, line 47, replace The information sensitive to users is not exposed to public with The information sensitive to users is not exposed to the public

(24) Column 6, line 1, replace The FIG. 1 with FIG. 1

(25) Column 6, line 11, replace step forming with step of forming

(26) Column 6, line 36, replace pursed with pursued

(27) Column 7, line 14 replace other with another

(28) Column 7, line 42 replace As followings is illustrated with Following are illustrations

CERTIFICATE OF CORRECTION (continued)
U.S. Pat. No. 7,849,136 B2

(29) Column 7, lines 9-14 replace The goal of the community may have both a temporal typed goal in which is disappeared in achieving the goal after temporarily generated based on the type and characteristics of the community, and a permanent typed goal in which repetitively continues an operation that is activated in a specific situation and deactivated in another specific situation, with The community may have two goals. One is a temporal typed goal and the other one is a permanent typed goal. The temporal typed goal is temporarily generated based on She type arid characteristic of the community, and after achieving the goal, the temporal typed goat is disappeared.

(30) Column 8, line 60, replace member (Action with member action

(31) Column 8, line 65, replace states (An with states an

(32) Column 9, line 25, replace The FIG. 3 with FIG. 3

(33) Column 10, lines 26-27 replace As following with Following

(34) Column 11, lines 17-18 replace The first scenario is an automatic media service, and the FIG. 4 ~ FIG. 6 are an exemplary drawing, with The first scenario is an automatic media service, FIG. 4 ~ FIG. 6 are exemplary drawings thereof.

(35) Column 12, line 5 replace which provides with which it provides

(36) Column 12, lines 15-16 replace The second scenario is related to a health care, and the FIG. 7 ~ FIG. 9 are an exemplary drawing thereof. with **The second scenario is related to *a* health care, FIG. 7 ~ FIG. 9 are exemplary drawings thereof.**

(37) Column 12, line 54 replace have with has

(38) Column 12, line 58, replace an with and

(39) Column 13, line 4, replace diverse environments, a system is needed in which defines the with diverse environments, a system is needed which defines the

(40) Column 13, line 7, replace provides the user with a service in which connects it to the with provides the user with a service which connects it to the

(41) Column 13, line 9, replace user with users

(42) Column 13, line 20, replace manager is required tor which generates and manages a with manager is required which generates and manages a

(43) Column 13, lines 26-27 replace As followings is illustrated with Following are illustrations

CERTIFICATE OF CORRECTION (continued)
U.S. Pat. No. 7,849,136 B2

(44) Column 13, line 44 replace As followings with Following

(45) Column 14, line 13 replace job with jobs

(46) Column 14, line 27 replace As followings is illustrated with Following are illustrations

(47) Column 14, line 48 replace united with uniting

(48) Column 14, line 60 replace Actions, with actions and

(49) Column 15, lines 49-50 replace "constrains" with "constraints"

(50) Column 15, line 54, replace an with a

(51) Column 15, line 61, replace descript with script

(52) Column 16, line 4, replace Semantic with semantically

(53) Column 16, line 51, replace but what jobs to with but what jobs need to

(54) Column 16, line 66 replace individual with individuals

(55) Column 17, line 2, replace computing devices existing in everywhere may with computing devices existing everywhere may

(56) Column 17, line 22, replace may search a service device located at the nearest to a with may search or a service device located nearest to a

(57) Column 17, line 24, replace the reading environment community may search a service with the reading environment community may search for a service

(58) Column 17, line 25-26, replace device located al the nearest one to the user among illumination with device located nearest to the user among illumination

(59) Column 17, line 34, replace In the meantime, since job process is in general unified in with in the meantime, since the job process is in general unified in

(60) Column 17, line 57, replace providing with provided

(61) Column 18, line 5, replace using with being used

(62) Column 18, line 19, replace As following are with Following is

(63) Column 18, line 60, replace may further comprise a middleware 1070 in which searches a with may further comprise a middleware 1070 which searches for a

(64) Column 18, line 64 replace As followings with Following

(65) Column 19, line 2 replace middle ware with middleware

(66) Column 19, line 3 replace the searching instruction may search a service member with the searching instruction may search for a service member

(67) Column 19, line 24 replace Followings with Following

(68) Column 19, line 38, replace is with was

(69) Column 19, line 40, replace searches a service available devices at occurring a situation with searches a service available device at an occurring situation

(70) Column 19, line 41, replace do binding with binds

(71) Column 19, line 48, replace prove with provide